United States Patent
McConnell et al.

(10) Patent No.: US 6,792,739 B1
(45) Date of Patent: Sep. 21, 2004

(54) AUTOMATED PROCESS AND APPARATUS FOR SUBSTANTIALLY SIMULTANEOUSLY FORMING MULTIPLE ARTICLES HAVING DIFFERENT PROPERTIES

(75) Inventors: Mark Edward McConnell, Naas (IE); Michael Frank Fryauf, West Branch, IA (US); Declan Connolly, County Kildare (IE); Gerald S. Szczech, Iowa City, IA (US)

(73) Assignee: Gillette Canada Company, Halifax (CA)

( * ) Notice: Subject to any disclaimer, the term of this patent is extended or adjusted under 35 U.S.C. 154(b) by 597 days.

(21) Appl. No.: 09/293,019

(22) Filed: Apr. 16, 1999

Related U.S. Application Data (63) Continuation of application No. 09/067,728, filed on Apr. 28, 1998, now abandoned.

(51) Int. Cl.[7] .................................. B65B 11/00
(52) U.S. Cl. ............................... 53/396; 53/122
(58) Field of Search ..................... 300/21; 53/122, 53/396, 238, 235; 209/555, 571

(56) References Cited

U.S. PATENT DOCUMENTS

| | | | |
|---|---|---|---|
| 4,205,752 A | * | 6/1980 | Malvick et al. |
| 4,241,835 A | * | 12/1980 | Lockett |
| 4,310,377 A | | 1/1982 | Lorenz ..................... 156/499 |
| 4,444,711 A | | 4/1984 | Schad ..................... 264/243 |
| 4,535,014 A | | 8/1985 | Wright ..................... 428/30 |
| 4,756,579 A | | 7/1988 | Boland et al. ............... 300/21 |
| 4,885,121 A | | 12/1989 | Patel ..................... 264/255 |
| 4,954,305 A | | 9/1990 | Weihrauch ................ 264/157 |
| 5,104,196 A | | 4/1992 | Boucherie ................... 300/5 |
| 5,150,307 A | * | 9/1992 | McCourt et al. |
| 5,256,048 A | * | 10/1993 | Jacobs et al. |
| 5,318,352 A | | 6/1994 | Holland ..................... 300/21 |
| 5,350,219 A | | 9/1994 | Shou-Jen ................... 300/21 |
| 5,352,025 A | | 10/1994 | Huang ..................... 300/21 |
| 5,458,400 A | | 10/1995 | Meyer ..................... 300/21 |
| 5,474,366 A | | 12/1995 | Strutt et al. ................. 300/21 |
| 5,536,458 A | | 7/1996 | Kawakita et al. ........... 264/46.6 |
| 5,588,714 A | * | 12/1996 | Boucherie |
| 5,609,890 A | | 3/1997 | Boucherie ................ 425/120 |
| 5,626,400 A | | 5/1997 | Humphries ................ 300/21 |
| 5,761,759 A | | 6/1998 | Leversby et al. ........... 15/167.1 |
| 5,765,927 A | | 6/1998 | Lewis, Jr. .................. 300/21 |
| 5,769,506 A | | 6/1998 | Boucherie .................. 300/2 |
| 5,863,102 A | | 1/1999 | Waguespack et al. ........ 300/11 |

FOREIGN PATENT DOCUMENTS

| | | | |
|---|---|---|---|
| DE | 3424681 A 1 | 7/1984 | ........... A46D/3/08 |
| DE | 4009585 | 2/1991 | ........... A46D/3/00 |
| DE | 4423145 | 1/1996 | ........... A46D/3/00 |
| DE | 44 23 145 A1 | 1/1996 | ........... A46D/3/00 |
| DE | 195 22 122 A1 | 1/1997 | ........... B29C/45/14 |
| DE | 195 42 102 A1 | 5/1997 | ........... B29C/45/16 |

(List continued on next page.)

OTHER PUBLICATIONS 2 page letter from W. Vorbeck to David Howley dated Oct. 30, 2002.

(List continued on next page.)

Primary Examiner—Eugene Kim (57) ABSTRACT

An apparatus for manufacturing toothbrushes is provided that includes a molding unit for substantially simultaneously molding toothbrush bodies, an element that removes toothbrush bodies from the molding unit, a tufter for securing tufts of bristles to toothbrush bodies to form toothbrushes, and a transport for automatically moving toothbrush bodies from the removal element to the tufter. A process for forming toothbrushes is also disclosed.

37 Claims, 12 Drawing Sheets

FOREIGN PATENT DOCUMENTS

| | | | |
|---|---|---|---|
| DE | 197 28 733 A1 | 5/1997 | ........... B29C/45/16 |
| DE | 19804830 A1 | 2/1998 | ........... A46D/3/00 |
| DE | 19722366 | 3/1998 | ........... A46D/3/00 |
| DE | 19742324 | 1/1999 | ........... A46D/3/08 |
| EP | 0 563 419 A1 | 3/1993 | ........... A46D/3/08 |
| EP | 0 673 741 A1 | 9/1995 | ........... B29C/45/13 |
| GB | 1539059 | 12/1975 | ........... A46D/3/00 |
| GB | 2108376 | 5/1983 | ........... A46D/3/08 |
| GB | 2 276 580 A | 10/1994 | ........... B29C/45/13 |
| JP | 63-265611 | 2/1988 | ........... B29C/45/13 |
| JP | 2-165923 | 6/1990 | ........... B29C/45/13 |
| JP | 10006363 | 1/1998 | ........... B29C/45/16 |

OTHER PUBLICATIONS

Attachment 1 to above letter, 2 pages dated Oct. 10, 2002.

Attachment 2 to above letter, 2 pages headed "Hoover" and dated Sep. 19, 2002.

Attachment 3 to above letter, 3 pages headed "boucherie".

Attachment 4 to above letter, 6 pages headed "Zahoransky" and dated Mar. 5, 2000.

Attachment 5 to above letter, 1 page summary of WO9955514.

Attachment 6 to above letter, 9 pages headed "Anchor Advanced Products, Inc." and dated Mar. 10, 1995.

Attachment 7 to above letter, 2 pages headed "boucherie" and dated Apr. 28, 1992.

One Page English Translation Description of Publication No. JP H–10 6363 (Published in Jan. 13, 1998); Previously Submitted.

* cited by examiner

AUTOMATED PROCESS AND APPARATUS FOR SUBSTANTIALLY SIMULTANEOUSLY FORMING MULTIPLE ARTICLES HAVING DIFFERENT PROPERTIES

This application is a continuation of Ser. No. 09/067,728, filed Apr. 28, 1998 now abandoned.

BACKGROUND OF THE INVENTION

The invention relates to manufacturing articles, and in particular to manufacturing toothbrushes.

Toothbrushes generally include a toothbrush body that includes a handle portion and a head portion, and tufts of bristles located at or near the head portion.

Toothbrush bodies are generally made by injection molding machines. These toothbrush bodies often consist of plastic and include multiple components. The different components may differ in nature, color, texture, density and hardness. For example, toothbrush bodies may include a relatively hard plastic base component and a colored rubberized gripping component.

After the toothbrush bodies are manufactured they are automatically removed from the molding machine and deposited onto a cooling conveyor. The cooling conveyor transports the toothbrush bodies to a bin. The bodies are then manually transported to a bristle tufting machine where they receive tufts of bristles and are formed into toothbrushes.

The tufting operation generally involves manually grabbing handfuls of differently colored toothbrush bodies so as to provide a mixture of differently colored toothbrush bodies to a hopper. A conveyor removes the toothbrush bodies randomly from the hopper and orients the bodies so that the head portion of the body is available to receive the tufts of bristles from the bristle tufting machine. The bristle tufting machine automatically staples tufts of bristles into the head of each toothbrush body to form a toothbrush. The finished toothbrushes are automatically deposited into a tray which is manually transported to a packaging machine.

SUMMARY OF THE INVENTION

In one aspect, the invention features an apparatus for manufacturing toothbrushes that includes: (a) a molding unit for substantially simultaneously molding toothbrush bodies, (b) an element that removes toothbrush bodies from the molding unit, (c) a tufter for securing tufts of bristles to toothbrush bodies to form toothbrushes, and (d) a transport for automatically moving toothbrush bodies from the removal element to the tufter. Preferably the removal element is capable of removing toothbrush bodies form the molding unit in the form of an array and maintaining toothbrush bodies in the array. In one embodiment, the transport sequentially provides individual toothbrush bodies from an array to the tufter. In another embodiment, the transport includes an element that selects toothbrush bodies having different properties (e.g., colors), and the transport automatically moves selected toothbrush bodies to the tufter.

In one embodiment, the molding unit includes a first cavity defining a toothbrush body, a first injection unit in fluid communication with the first cavity, and a second injection unit also in fluid communication with the first cavity. In another embodiment, the molding unit further includes a second cavity defining a second toothbrush body, and a third cavity defining a third toothbrush body. The first injection unit is in fluid communication with the first cavity and the second cavity, and the second injection unit is in fluid communication with the first cavity and the third cavity. The injection units are capable of substantially simultaneously injecting a first molding compound having a first property into the second cavity to form a toothbrush body having a first property, injecting a second molding compound having a second property into the third cavity to form a toothbrush body having a second property, and injecting either the first or the second molding compound into the first cavity to form a toothbrush body having a property corresponding to the injected molding compound.

In other embodiments, the molding unit includes a first cavity defining a toothbrush body and a second cavity defining a toothbrush body, and the first injection unit is in fluid communication with the first cavity, and the second injection unit is in fluid communication with said second cavity. In preferred embodiments, the first cavity and the second cavity define substantially similar toothbrush bodies. In one embodiment, the injection units are capable of substantially simultaneously injecting a first molding compound into the first cavity, and injecting a second molding compound into the second cavity.

The transport preferably includes a first conveyor for moving toothbrush bodies from an array to the tufter; and a second conveyor for receiving the array from the removal element and moving the array to the first conveyor. In one embodiment, the element for removing and the transport are provided in the form of an automated mechanical transfer unit. In a preferred embodiment, the transport is capable of selecting toothbrush bodies to create an array of toothbrush bodies having different properties (e.g., colors).

In another embodiment, the apparatus further includes a packaging machine that packages individual toothbrushes, and a second transport for automatically moving toothbrushes from the tufter to the packaging machine. In one embodiment, the first transport, the removal element, and the second transport are provided in the form of an automated mechanical transfer unit. In another embodiment, the apparatus further includes a second packaging machine for automatically packaging packaged toothbrushes into a second package such that the second package contains a plurality of toothbrushes having different properties (e.g., colors).

In another aspect, the invention features a process for forming toothbrushes having different properties. The process includes substantially simultaneously forming toothbrush bodies having different properties in one mold, automatically transporting the toothbrush bodies to a tufter, and securing tufts of bristles to the toothbrush bodies to form toothbrushes having different properties (e.g., colors). In one embodiment, the step of forming toothbrush bodies includes forming toothbrush bodies that are substantially similar in shape. In another embodiment, the process further includes automatically transporting the toothbrushes from the tufter to a packaging machine, and automatically packaging the toothbrushes. In other embodiments, the process further includes selecting toothbrush bodies (e.g., to create an array of differently colored toothbrush bodies) prior to automatically transporting the toothbrush bodies to a tufter.

In another aspect, the invention features an apparatus for manufacturing articles having different properties. The apparatus includes a molding unit for substantially simultaneously molding articles having different properties; an element that removes the articles from the mold cavities; a packaging machine for automatically packaging the articles; and a transport for automatically moving the articles from the removal element to the packaging machine.

In other aspects, the invention features a process for forming articles having different properties from a mold that includes cavities defining substantially similar articles. The process includes substantially simultaneously forming articles having different properties in the mold, automatically transporting the articles to a packaging machine, and packaging the articles to form packaged articles having different properties.

In one embodiment, the invention features an apparatus for manufacturing at least one article. The apparatus includes: a molding unit for molding an article where the molding unit includes a first cavity defining an article, a first injection unit in fluid communication with the first cavity, and a second injection unit also in fluid communication with the first cavity; an element that removes the article from the molding unit; a packaging machine for automatically packaging the article; and a transport for automatically moving the article from the removal element to the packaging machine.

As used herein, the term "toothbrush body" is intended to refer to any portion of the toothbrush body, e.g., the entire toothbrush body including the head portion and the handle portion; the head portion; the handle portion; portions of the head portion; and portions of the handle portion.

The invention permits the manufacture of articles (e.g., toothbrush bodies) having a predetermined variety of properties (e.g., different colors) from a single mold in a single molding cycle. This in turn allows control over the subsequent manufacture and packaging of toothbrushes such that single packages of multiple toothbrushes can be manufactured where each package contains a predetermined multiple of toothbrushes having different properties (e.g., a predetermined number of red, yellow or blue handled toothbrushes in a single package). The invention also permits the selection of a predetermined variety of articles to achieve an array of articles having a variety of properties. The present invention thus avoids the need for manual intervention or assistance in the mixing of toothbrushes to achieve a desired mixture of toothbrushes having different properties in a single package. The apparatus also provides control over the color mixture in each package of toothbrushes shipped to a customer.

The arrangement of the injection units in the molding unit also advantageously permits variation in injection timing which allows molding compounds having differing cure rates to be injected into mold cavities at different times so that cure is completed substantially simultaneously for each molding compound. This allows a single mold cycle to accommodate a variety of molding compounds.

The apparatus of the present invention is also capable of producing an ordered array of toothbrush bodies and maintaining the relative order of the toothbrush bodies throughout the manufacturing process. Maintenance of the ordered array also simultaneously maintains the orientation of the toothbrush bodies, which facilitates tufting and packaging processes.

Other features and advantages of the invention will become apparent from the following description of the preferred embodiments thereof, and from the claims.

DESCRIPTION OF THE PREFERRED EMBODIMENTS

The invention features an apparatus and method for the automated manufacture of a plurality of articles. The apparatus is capable of permitting the selective manufacture of a plurality of articles having pre-selected properties in a single molding cycle. The invention also features an apparatus that is capable of simultaneous manufacture of a plurality of articles that differ from each other in at least one property (e.g., color, composition, texture, density, and hardness). The invention is particularly useful for toothbrush manufacturing and is described below with reference to toothbrushes, however, it is to be understood that the invention is applicable to any molded article.

Figure 1:
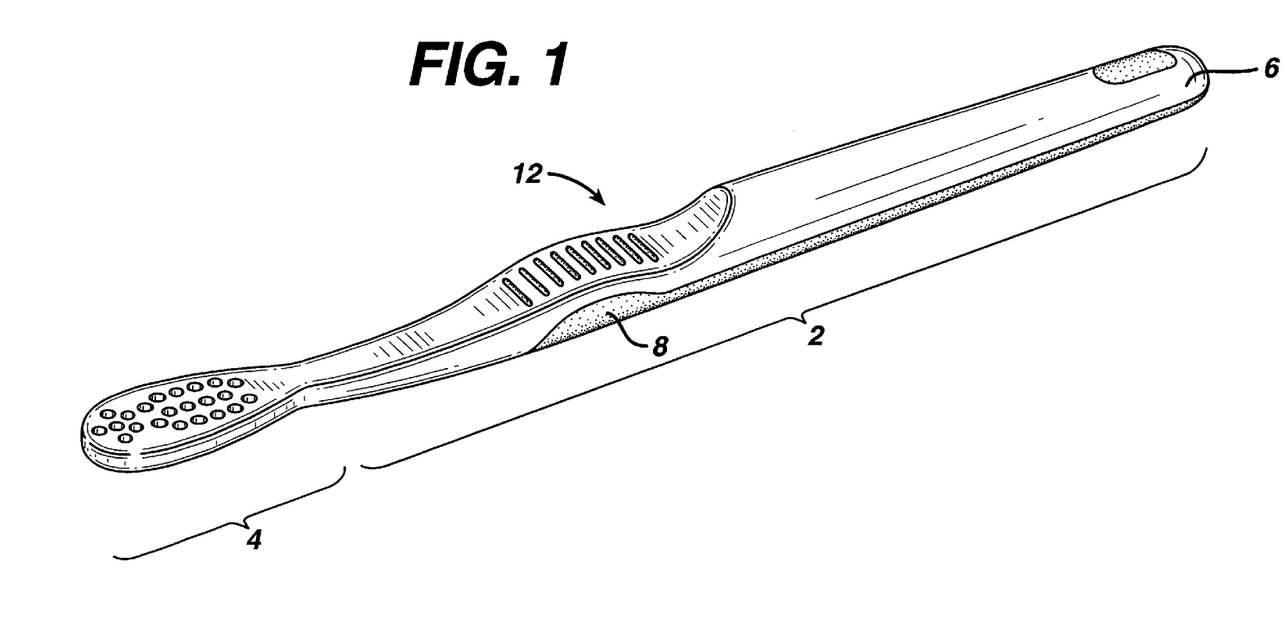
FIG. 1 is a perspective view of a toothbrush body.

Referring to FIG. 1, toothbrush body 12 includes handle portion 2 and head portion 4. Toothbrush body 12 can further include a base member 6, e.g., a portion made from a relatively harder, more rigid plastic such as polypropylene, and a gripping member 8, e.g., a portion made from a relatively rubbery material such as, e.g., styrene-butadiene-styrene triblock copolymer (commercially available under the trade designation Kraton from Shell Chemical Co.). Multiple component toothbrush bodies are described, e.g., in U.S. Pat. No. 5,256,048 (Jacobs et al.).

The apparatus for manufacturing toothbrushes having toothbrush bodies of different properties will now be described using color as the property that differs. It is intended that the property that differs could be at least one of a variety of properties including, e.g., color, composition, texture, density, hardness, and various combinations thereof.

Figure 2:
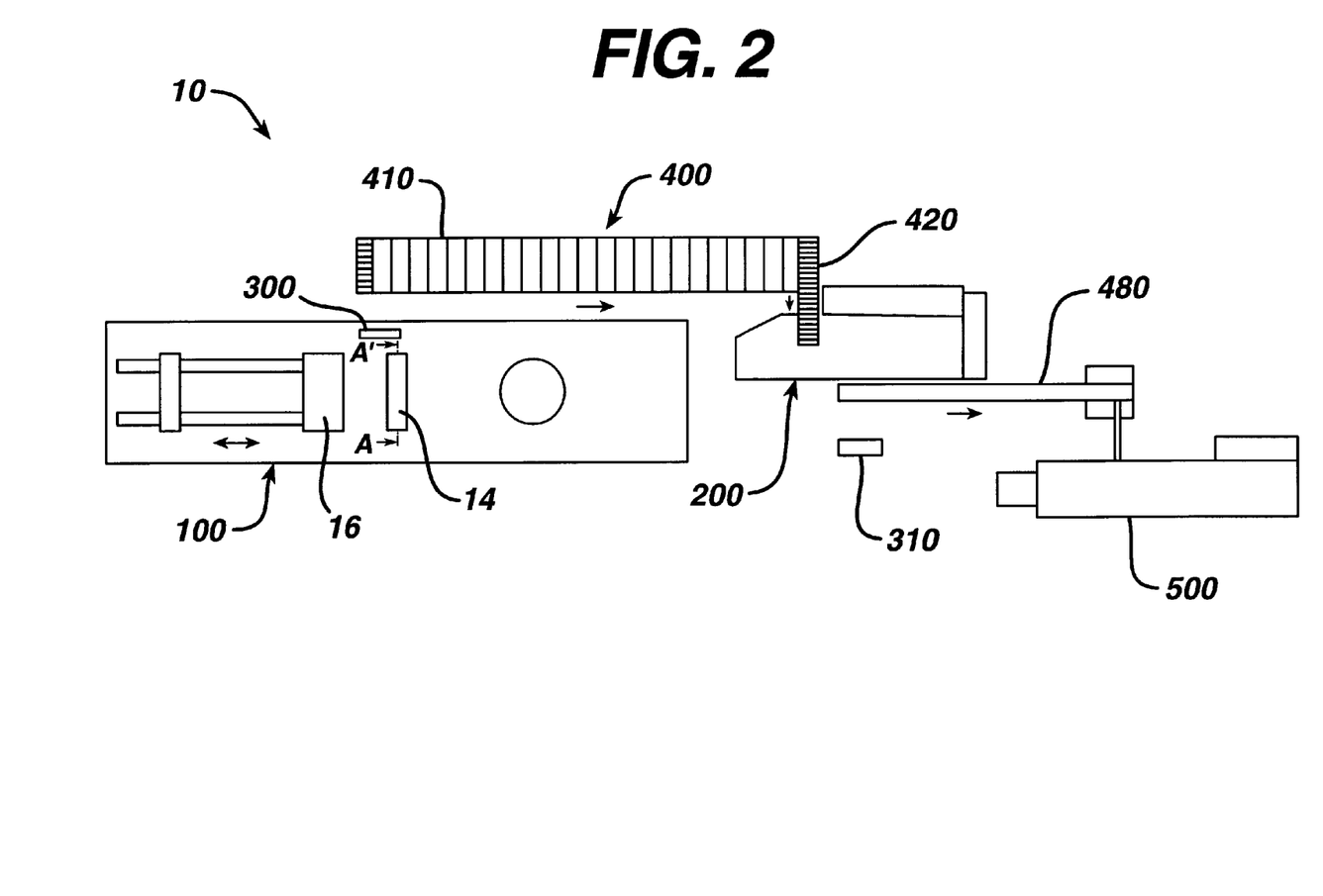
FIG. 2 is a schematic view of one embodiment of the toothbrush manufacturing apparatus of the present invention.

Referring to FIG. 2, toothbrush manufacturing apparatus 10 includes a horizontally mounted injection molding unit 100 that forms toothbrush bodies 12, e.g., the relatively more rubbery gripping portion of a multi-component toothbrush handle. An automated mechanical transfer 300 removes the molded bodies 12 from molding unit 100 and loads them onto conveyor 400, which transports the molded bodies to tufter 200. Tufter 200 secures tufts of bristles to toothbrush body 12 to form the finished toothbrush. A second automated mechanical transfer 310 automatically picks the finished toothbrush and places it on conveyor 480 which moves the toothbrush to packaging unit 500. Packaging unit 500 encases the finished toothbrush in a packaging material, e.g., a blister pack, or a box and cellophane, to form a packaged toothbrush. The packaged toothbrush can then be transported (e.g., by automated transport or conveyor) to a second packaging machine (not shown) where a number individually packaged toothbrushes are packaged together to form a second package.

Figure 3:
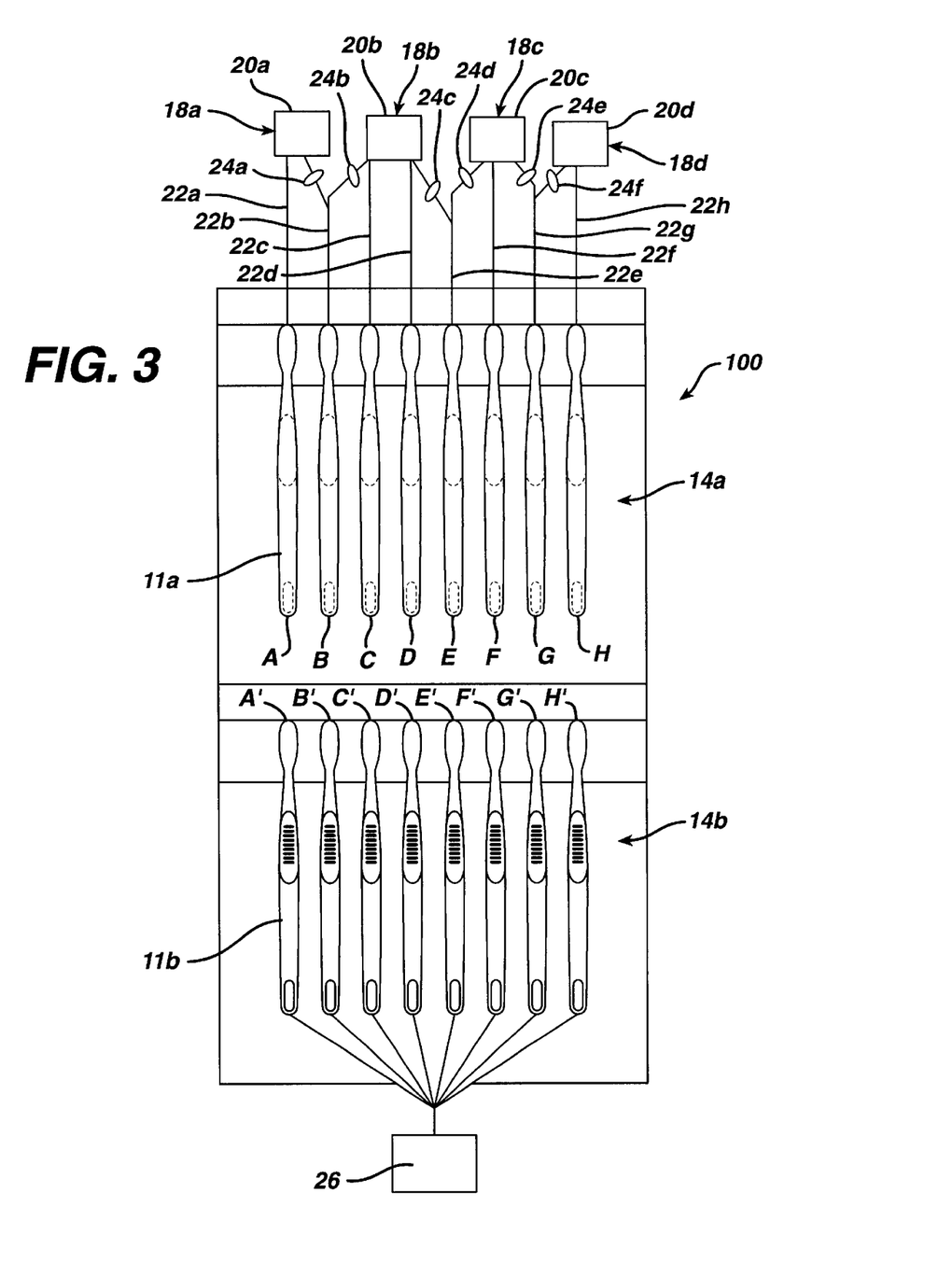
FIG. 3 is a cross section view taken along line A–A' of the injection molding unit of the apparatus FIG. 2.

Referring to FIGS. 2 and 3, horizontally mounted injection molding unit 100 includes a stationary mold part 14 and a mobile mold part 16. Mobile mold part 16 travels along a horizontal path between a closed position in which mold parts 16, 14 are in sealing contact with each other, and an open position, in which mobile mold part 16 and stationary mold part 14 are separated by a distance to allow automated mechanical transfer 300 access to the formed bodies 12.

In the closed position, mold parts 14 and 16 define a first set 14a of mold cavities A, B, C, D, E, F, G and H, each of which defines a portion 11a of a toothbrush body 12, e.g., the rubberized gripper portion of the toothbrush body. The portion of each mold cavity A–H located on mold part 14 is shown in FIG. 3. The mold cavities can define the entire toothbrush body, i.e., the handle portion and the head portion, or a portion of the toothbrush body.

Molding unit 100 also includes injection units 18a–8d, which are in fluid communication with mold cavities A–H. Injection units 18a–8d are capable of injecting liquid molding compound into mold cavities A–H.

Each injection unit includes a reservoir 20a–20d for holding a molding compound, and conduits 22a–22h through which a molding compound can pass from a reservoir to a mold cavity. Preferably each reservoir contains a molding compound having a different color such that each mold cycle produces toothbrush bodies of different colors; preferably each mold cycle produces at least four differently colored toothbrush bodies, e.g., two blue, two red, two green, and two yellow toothbrush bodies.

Referring to FIG. 3, reservoir 20a of injection unit 18a is connected to cavities A and B via conduits 22a and 22b respectively. Similarly, reservoir 20b is connected to cavities B, C, D and E via conduits 22b–22e respectively. Reservoir 20c is connected to cavities E–G via conduits 22e and 22g, and reservoir 20d is connected to cavities G and H via conduits 22g and 22h respectively. Injection unit 18b shares conduit 22b with injection unit 18a and conduit 22c with injection unit 18c. Injection units 18c and 18d share conduit 22f.

Fluid communication between the injection units and the mold cavities can be controlled by gating manifolds 24a–24f which open and close the fluid communication between reservoirs 20a–20b, and cavities B, E and G. Gating manifolds 24a and 24b, for example, can be placed in an open position or a closed position to regulate the fluid communication between reservoirs 20a and 20b and cavity B. When gating manifold 24a is in an open position, reservoir 20a is in fluid communication with cavity B such that a molding compound in reservoir 24a can travel through conduit 22b to cavity B. When gating manifold 24a is in the open position, manifold 24b can be in the open or closed position to maintain or close communication between reservoir 20b and cavity B. When manifold 24b is in the closed position molding compound is prevented from flowing from reservoir 20b to cavity B.

In an alternate embodiment, a single manifold can be used to open communication between an injection unit and a cavity and simultaneously close communication between another injection unit and the same cavity and vice versa. Referring to cavity B, for example, a single manifold can open communication between injection unit 18a and cavity B and simultaneously close communication between injection unit 18b and cavity B.

Gating manifolds 24a–24f allow a number of toothbrush bodies having a variety of different colors to be manufactured simultaneously. By opening and closing the various manifolds, the number and variety of toothbrush bodies can be altered. In addition, by including injection units having more than one common conduit leading to more than one common cavity, the degrees of freedom, in terms of available color variety, are increased. For example, referring to FIG. 3, the molding compound in reservoir 20b can be transferred to two, three or four cavities depending upon the configuration of gating manifolds 24b and 24c. The molding compound in reservoir 20c can be transferred to one, two or three cavities and the molding compounds in reservoirs 20a and 20d can be transferred to one or two cavities.

Although the molding unit is described as having eight mold cavities and four injection units, it is contemplated that any number of molding cavities and injection units could be placed in fluid communication with each other in various permutations. In addition, gating devices can be positioned as desired to control the flow of molding compound to the cavities.

The injection molding unit can further include a second set 14b of mold cavities A'–H', each of which defines a second portion 11b of toothbrush body 12, e.g., the relatively hard, more rigid plastic (e.g., polypropylene) base portion of the toothbrush body. The second portion 11b of toothbrush body 12 defined by mold cavities A'–H' is different (e.g., in shape, dimension and combinations thereof) from that portion 11a of toothbrush body 12 defined by cavities A–H. Injection unit 19 is in fluid communication with mold cavities A'–H' and is capable of injecting molding compound into mold cavities A'–H' to form second portion 11b of toothbrush body 12. Preferably portion 11b of toothbrush body 12 is formed first and then portion 11b is transferred (e.g., by automated mechanical transfer) to the first set 14a of mold cavities A–H (e.g., portion 11b of toothbrush body formed in cavity A' is transferred to cavity A) where colored molding compound is injected into cavities A–H to form a dual component toothbrush body, and where processing continues as described above.

Figure 4:
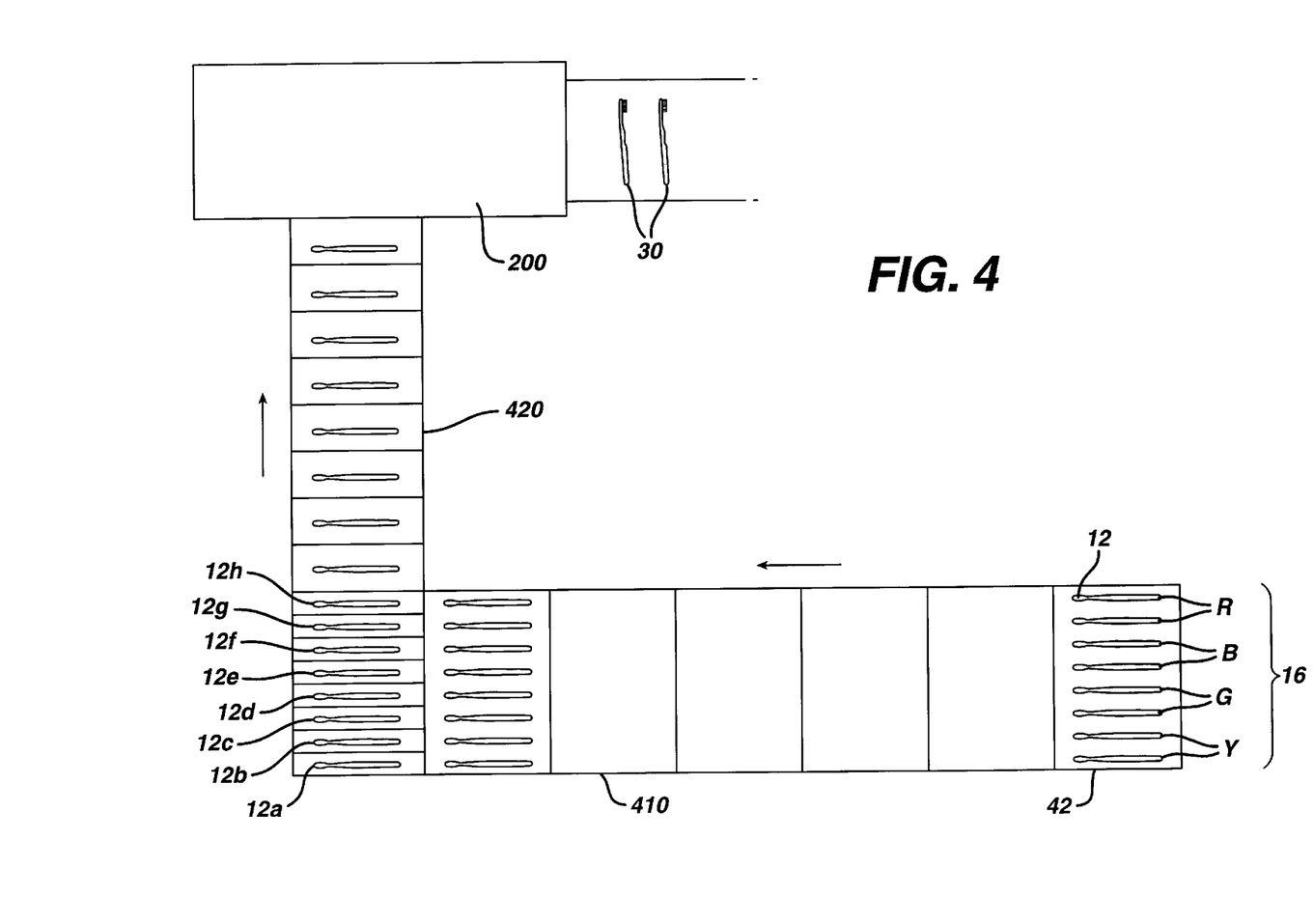
FIG. 4 is a top view of one embodiment of the conveyor of the apparatus of FIG. 2.

Referring to FIGS. 2 and 4, automated mechanical transfer 300 assists in removing toothbrush bodies 12 from the mold cavities (e.g., mold cavities A–H) and transferring toothbrush bodies 12 to conveyor 400. Automated mechanical transfer 300 preferably removes each toothbrush body 12a–12e simultaneously from injection molding unit 100 and transfers the bodies to a first position 42 on conveyor 400. More preferably, automated mechanical transfer 300 simultaneously picks the entire array 16 of toothbrush bodies 12a–12e and places the array 16 onto conveyor 400 in the same order in which the bodies were formed. Automated mechanical transfer 300 is also capable of orienting the individual toothbrush bodies 12, or the entire array 16 of toothbrush bodies 12a–12e, such that the head portions of the toothbrush bodies 12 are in proper orientation for transfer to subsequent operations (e.g., bristle tufting machine 200 or packaging).

Figure 5:
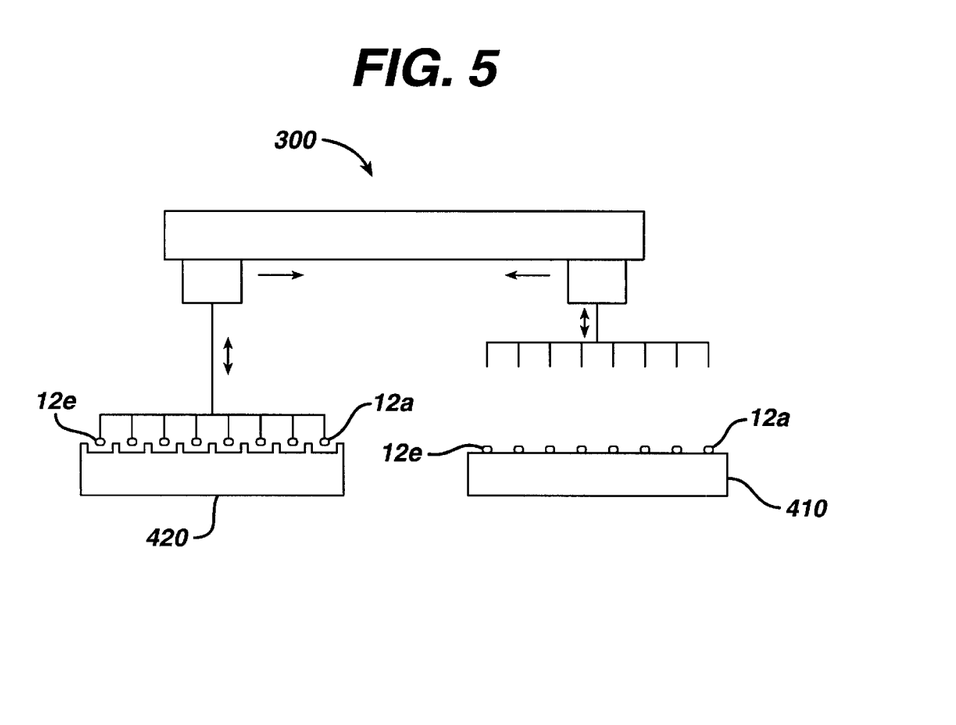
FIG. 5 is a side view of the automated mechanical transfer and the conveyors of the apparatus of FIG. 2.
Figure 6:
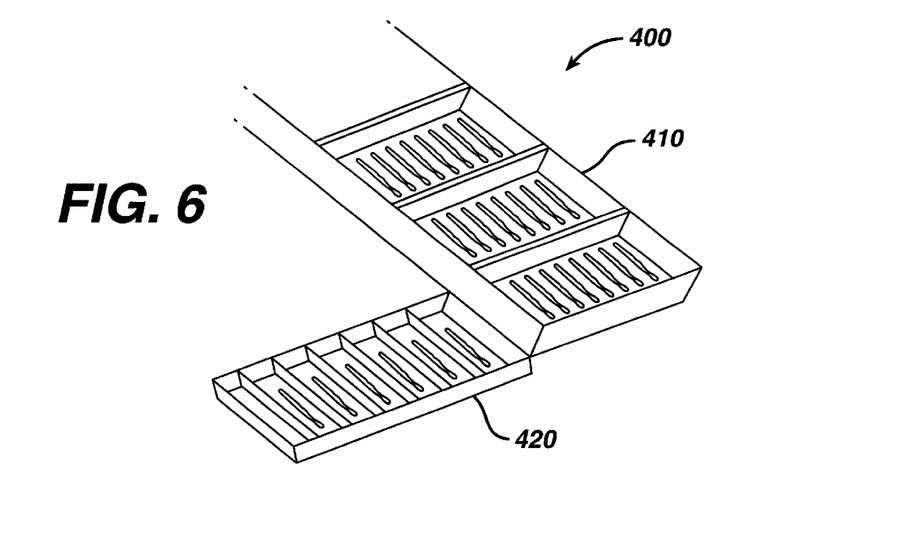
FIG. 6 is a perspective view of one end of another embodiment of the conveyor of FIG. 2.

Referring to FIGS. 4–6, conveyor 400 includes a first conveyor 410, e.g., a nested cooling conveyor, for receiving and cooling toothbrush bodies 12, and a second conveyor 420, e.g., a walking beam conveyor, for sequentially feeding toothbrush bodies 12 to tufter 200. First conveyor 410 moves toothbrush bodies 12 to second conveyor 420 while maintaining toothbrush bodies 12 in the order in which they were placed onto the conveyor by automated mechanical transfer 300. Toothbrush bodies 12 are then transferred to the second conveyor 420 from first conveyor 410. The transfer from first conveyor 410 to second conveyor 420 can occur in a number of ways including, e.g., first conveyor 410 feeding toothbrush bodies directly, onto second conveyor 420 arranged perpendicularly to first conveyor 410, as shown in FIG. 4; automated mechanical transfer 300 picking the toothbrush bodies, e.g., the array 16 of toothbrush bodies 12a–12e, from first conveyor 410 and placing the toothbrush bodies onto second conveyor 420, as shown in FIGS. 5 and 6; and combinations thereof. Automated mechanical transfer 300 is capable of orienting the toothbrush bodies throughout the manufacturing process.

Tufter 200, includes a plurality of tuft insertion devices capable of inserting a plurality of tufts of bristles into the head portion of the toothbrush body. Tufter 200 receives an oriented toothbrush body 12, and inserts a plurality of tufts of bristles into the head portion 4 of the toothbrush body 12 to form a finished toothbrush 30. Tufter 200 can also trim the bristles and end rounding the bristle filaments of head portion 4.

Referring to FIG. 2, second automated mechanical transfer 310 automatically picks toothbrushes 30 from tufter 200 and places them on third conveyor 480 where they move to packaging machine 500. Preferably second automated mechanical transfer 310 maintains the orientation and order of the toothbrushes such that control over the color variety is maintained. As a result, the color mixture set at the molding operation can be maintained throughout the toothbrush manufacturing process up to and including the step of packaging the toothbrushes. Packaging machine 500 packages each individual toothbrush into a package (e.g., a blister pack), and can also be configured to package a plurality of toothbrushes into a single package or a plurality of the individually packaged toothbrushes into a second package.

Apparatus 10 can also include a variety of additional processing units including, e.g., a second packaging machine for packaging the individually packaged toothbrushes into a second package such that the second package includes a variety of differently colored individually packaged toothbrushes.

Figure 7:
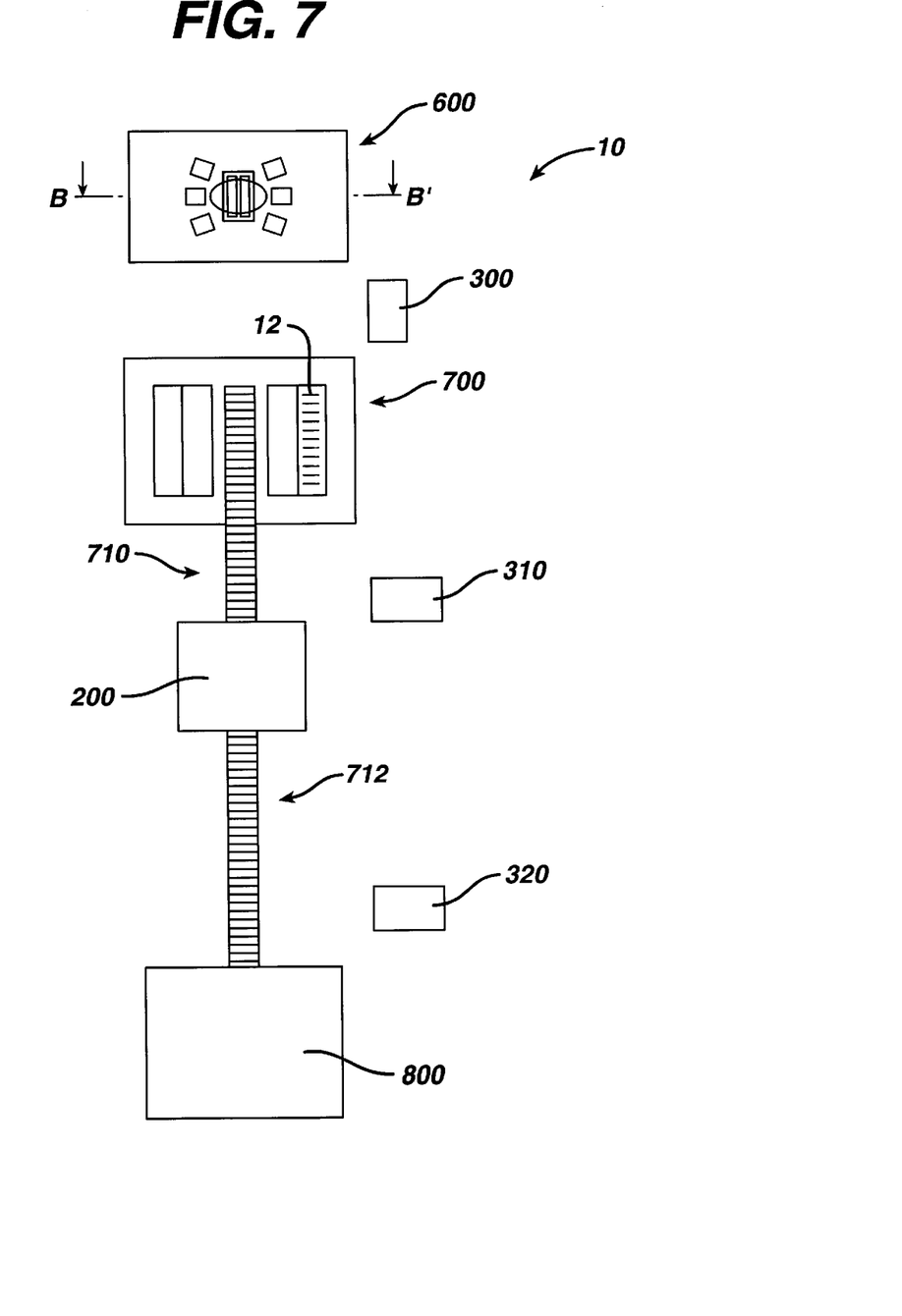
FIG. 7 is a schematic view of another embodiment of the toothbrush manufacturing apparatus of the present invention.
Figure 8:
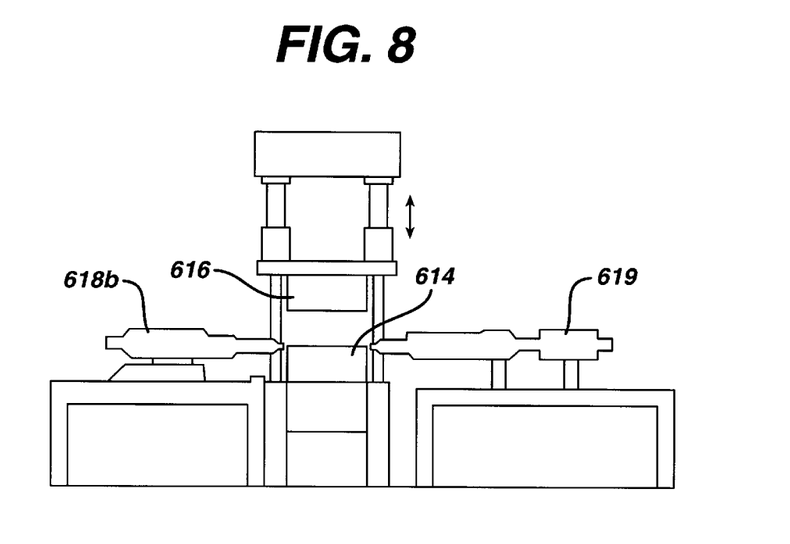
FIG. 8 is a view taken in cross section along line B–B' of the molding unit of FIG. 7.

A second apparatus 90 for manufacturing toothbrushes having different colored bodies, is shown in FIGS. 7–12. Features that are in common with apparatus 10 shown in FIGS. 2–6 are designated with the same reference numerals. Referring to FIGS. 7 and 8, apparatus 90 includes vertically mounted injection molding unit 600, which forms toothbrush bodies, and automated mechanical transfer 300, which removes the molded bodies from molding unit 600 and transfers them to a cooling station 700. Automated mechanical transfer 300 then selects toothbrush bodies 12 from cooling station 700 so as to create an array of differently colored toothbrush bodies, e.g., an array of five toothbrush bodies that includes blue, green, red, purple, and yellow toothbrush bodies. The automated mechanical transfer can be programmed to select any number of toothbrush bodies in a variety of color combinations. Automated mechanical transfer 300 then places the selected array onto conveyor 710, which feeds individual toothbrush bodies 12 to tufter 200. After tufter 200 secures tufts of bristles to the toothbrush body to form finished toothbrush 30, a second automated mechanical transfer 310 picks finished toothbrush 30 and places it on second conveyor 712. Second conveyor 712 moves toothbrush 30 to packaging machine 800 where the toothbrush is packaged. Optionally, third automated mechanical transfer 320 selectively provides toothbrushes 30 to packaging machine 800.

Figure 9:
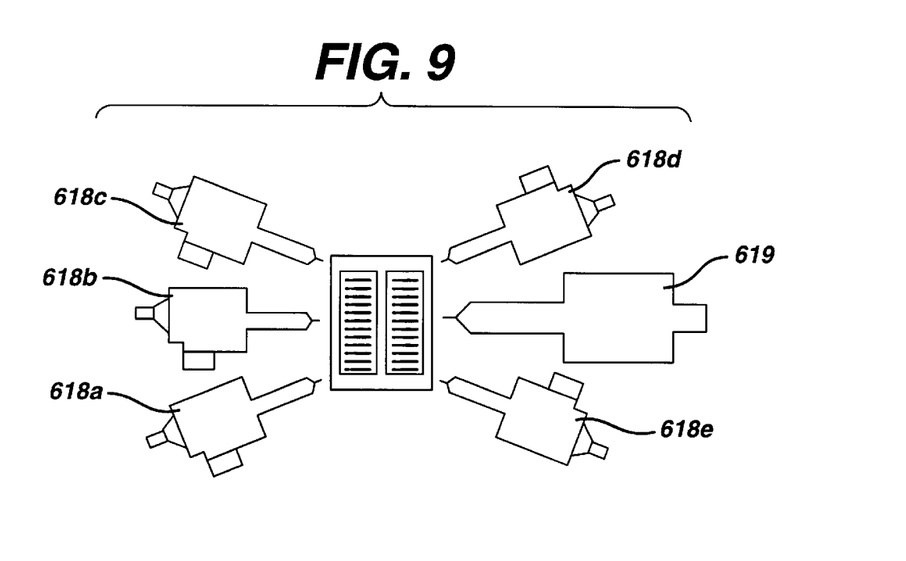
FIG. 9 is an enlarged top view of one part of the molding unit of FIG. 7.
Figure 10:
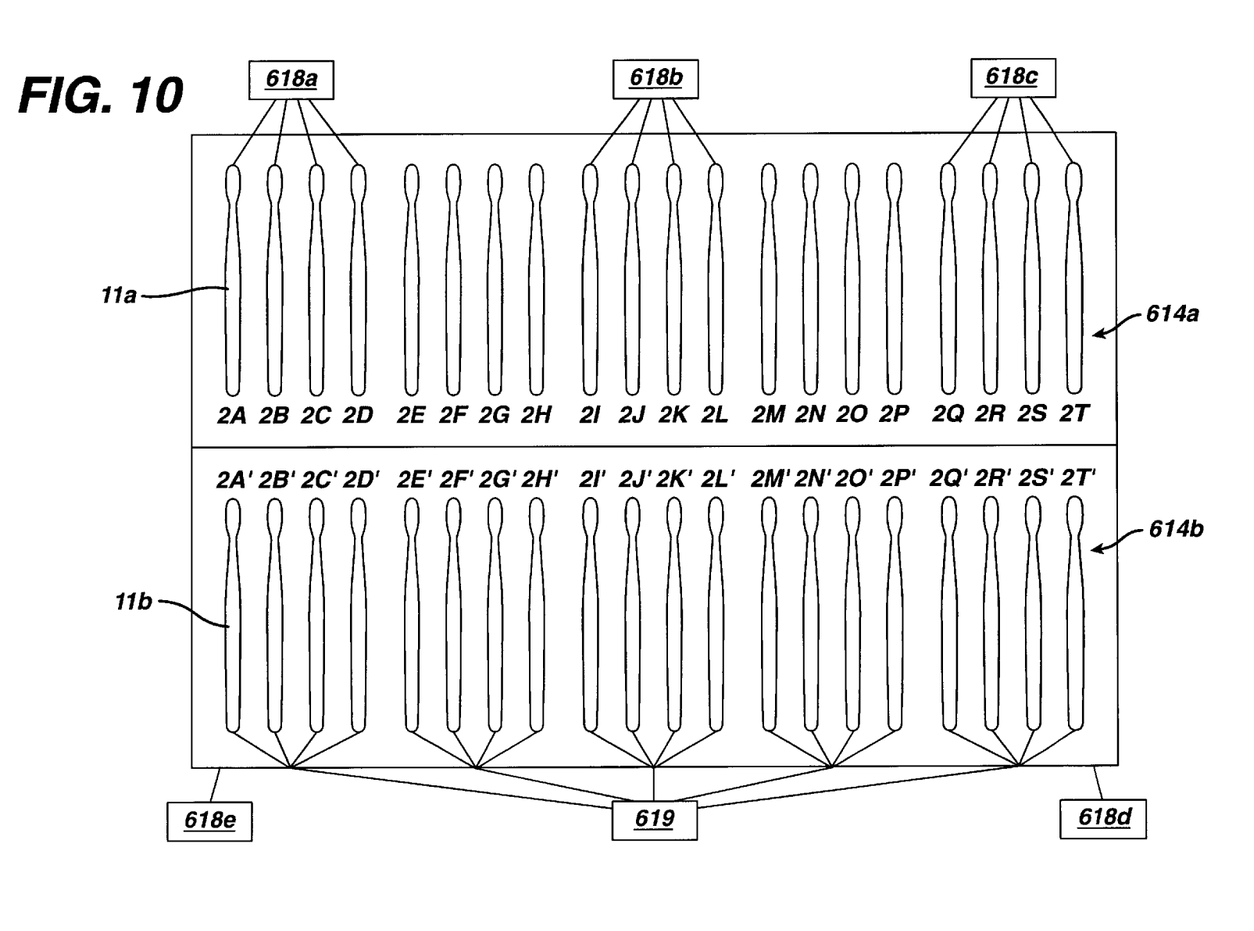
FIG. 10 is an enlarged, rotated top view of a portion of the mold of FIG. 7.

Vertically mounted injection molding unit 600 includes a stationary mold part 614 and a mobile mold part 616, as shown in FIGS. 8–10. Mold parts 614, 616 are arranged such that mobile mold part 616 travels along a vertical path between an open position, (as shown in FIG. 8) in which the mold parts 614, 616 are separated by a distance to allow automated mechanical transfer 300 access to the formed bodies 12, and a closed position in which mold parts 614, 616 are in sealing contact with each other. Referring to FIG. 10, mold part 614 includes a portion of a first set 614a of mold cavities A–T, each of which defines a portion 11a of a toothbrush body. Each of five injection units 618a–e is in fluid communication with four of the twenty cavities 2A–2T, such that each injection unit 618a–e is capable of injecting a molding compound into four of the twenty cavities.

Referring to FIG. 10, injection unit 618a is in fluid communication with mold cavities 2A–2D; injection unit 618b is in fluid communication with mold cavities 2I–2L; injection unit 618c is in fluid communication with mold cavities 2Q–2T; injection unit 618d is in fluid communication with mold cavities 2M–2P; and injection unit 618e is in fluid communication with mold cavities 2E–2H.

Preferably each injection unit injects a different molding compound into its corresponding cavities such that the toothbrush bodies formed from each of the different molding compounds exhibit different properties, e.g., color.

Injection molding unit 600 can further include a second set 614b of mold cavities 2A'–2H', each of which defines a second portion 11b of a toothbrush body 12, as shown in FIG. 10. A sixth injection unit 619, in fluid communication with cavities 2A'–2T', is capable of injecting molding compound into each mold cavity 2A'–2T'. The molding compound injected by the sixth injection unit is preferably of a material that, upon molding, exhibits a property that is distinct from that of the portions of the toothbrush body formed in mold cavities 2A–2T. Portions 11b of toothbrush bodies 12 formed in mold cavities 2A'–2T'are then transferred to first set 614a of mold cavities 2A–2T where processing continues as described above.

Figure 11:
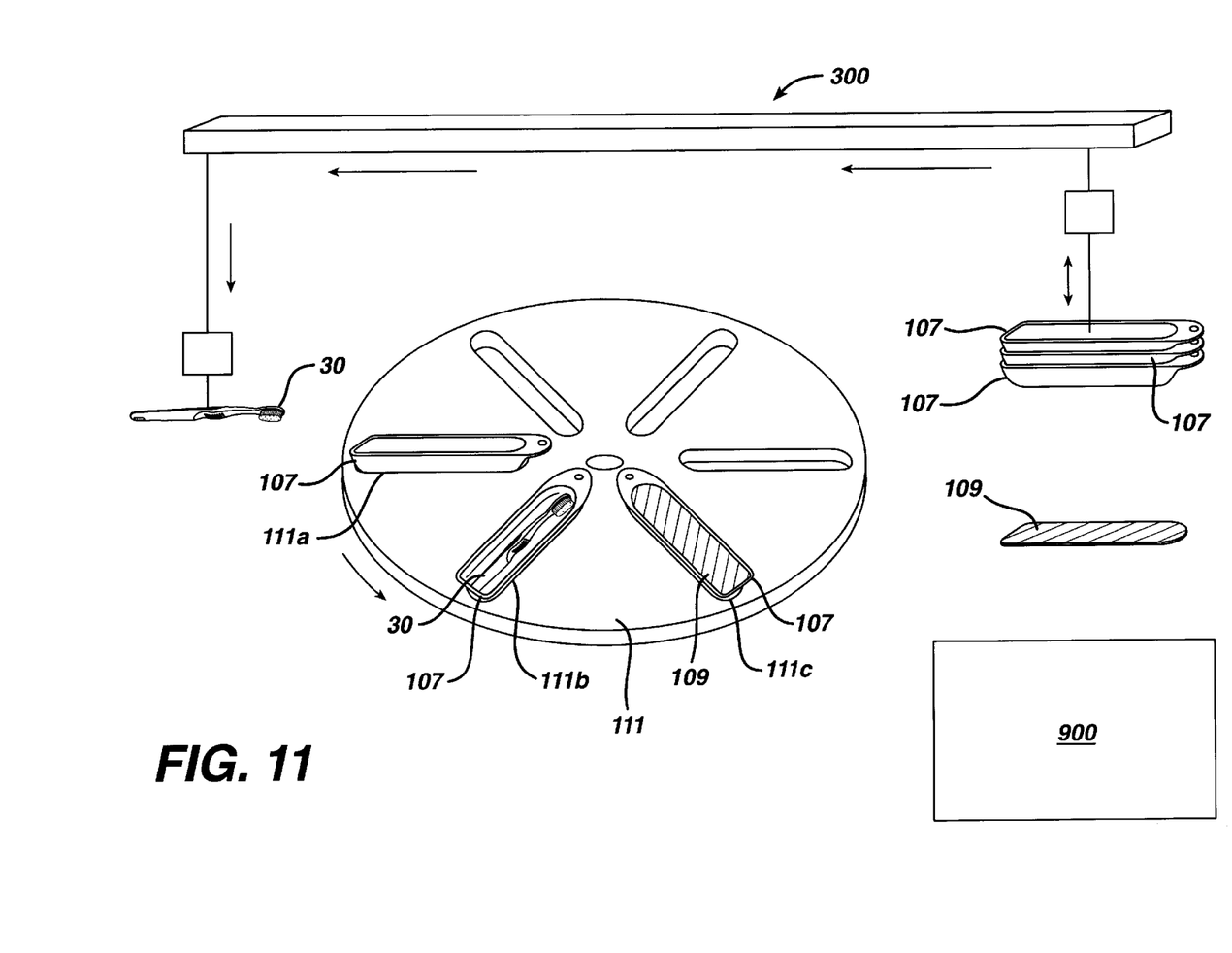
FIG. 11 is a perspective view of one embodiment of the packaging unit of the apparatus of FIG. 7.
Figure 12:
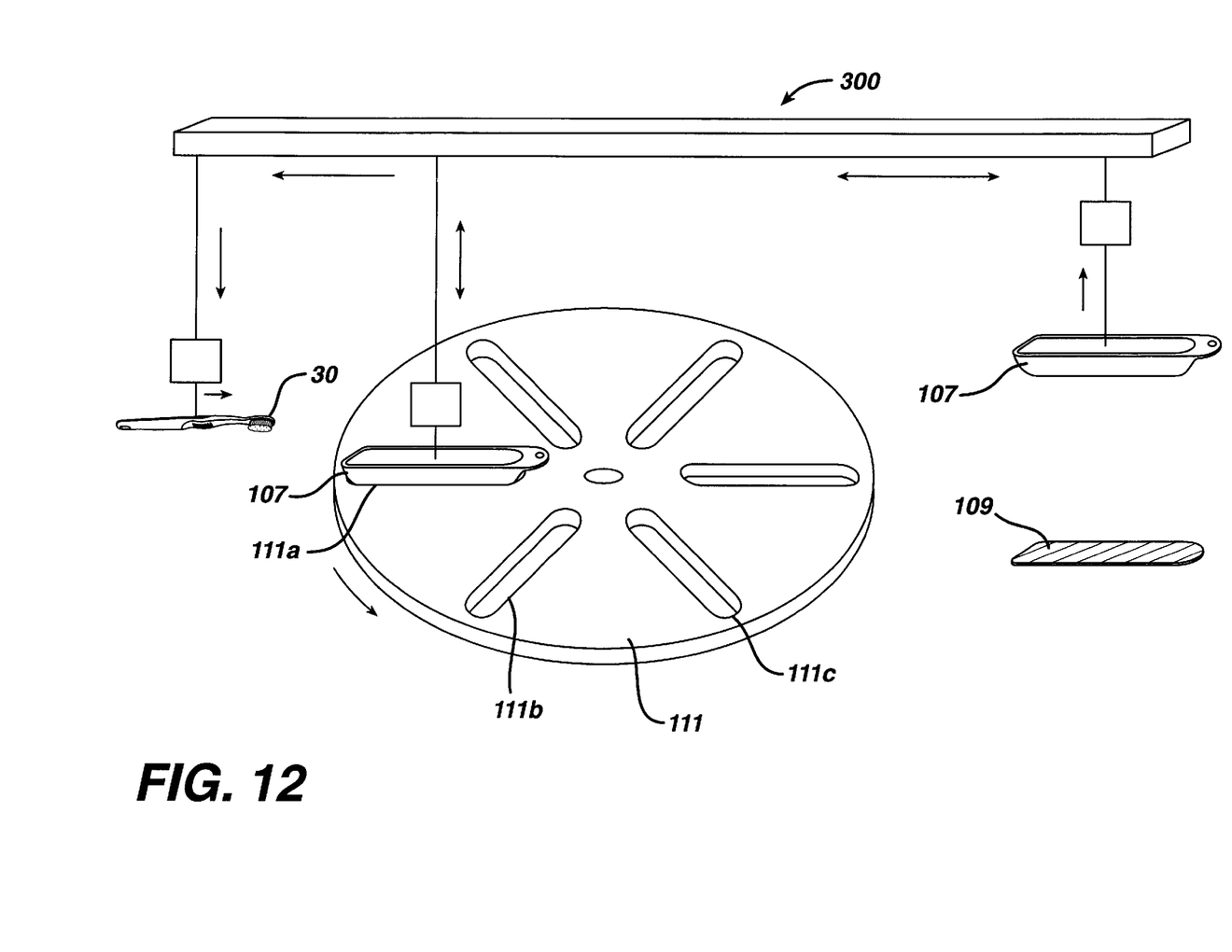
FIG. 12 is a side view of one embodiment of the packaging unit of FIG. 11.

Referring to FIGS. 11 and 12, one embodiment of the packaging operation is shown in which automated mechanical transfer 300 picks a blister pack 107 and places it in position 11a of turret 111 where it remains ready to receive finished toothbrush 30. Automated mechanical transfer 300 then returns to tufter 200 and retrieves a finished toothbrush 30. Automated mechanical transfer 300 then transfers finished toothbrush to blister pack 107 waiting at index position 111a on turret 111, and places finished toothbrush 30 into blister pack 107. Blister pack 107, filled with finished toothbrush 30, is then indexed to full position 111b during which time automated mechanical transfer 300 retrieves a cover 109, e.g., a film or card. Automated mechanical transfer 300 then returns to the filled blister pack 107 at index position 111b and places cover 109 onto the filled blister pack 107. Automatic mechanical transfer 300 then transfers the blister pack assembly, shown at index position 111c, to sealing unit 900, where the blister pack assembly is sealed to form a package around the toothbrush. Automated mechanical transfer 300 waits for the completion of the sealing operation and then transfers the sealed package to a transport mechanism where the sealed package can undergo further processing, e.g., additional packaging or storage. Automated mechanical transfer 300 then returns to the ready position where it waits to start the process again with a newly formed set of injection molded toothbrush bodies. The automated mechanical transfer and packaging apparatus of FIGS. 11 and 12 can also be incorporated into apparatus 10.

Figure 13:
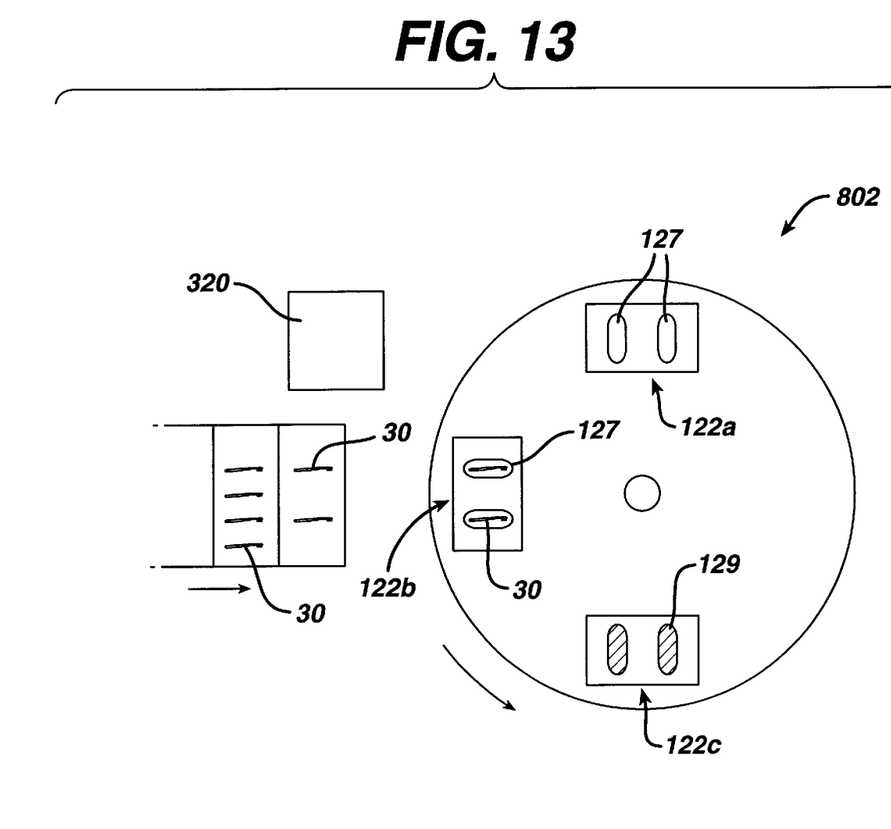
FIG. 13 is a perspective view of another embodiment of the packaging unit of the apparatus of FIG. 7.

Referring to FIG. 13, another embodiment of packaging operation is shown. Packaging unit 802 forms blister packs 127 at position 122a and rotates formed blister pack 127 to position 122b. A second automated transfer 320 picks toothbrush 30 and places toothbrush 30 into blister pack 127. Packaging unit 802 rotates the filled blister pack to position 122c, applies a cover 129 to filled blister pack 127, and seals the assembly to form a packaged toothbrush 131. If necessary, packaging unit 802 separates e.g., by punching or cutting, blister pack 127 from other blister packs with which it may be associated.

Figure 14:
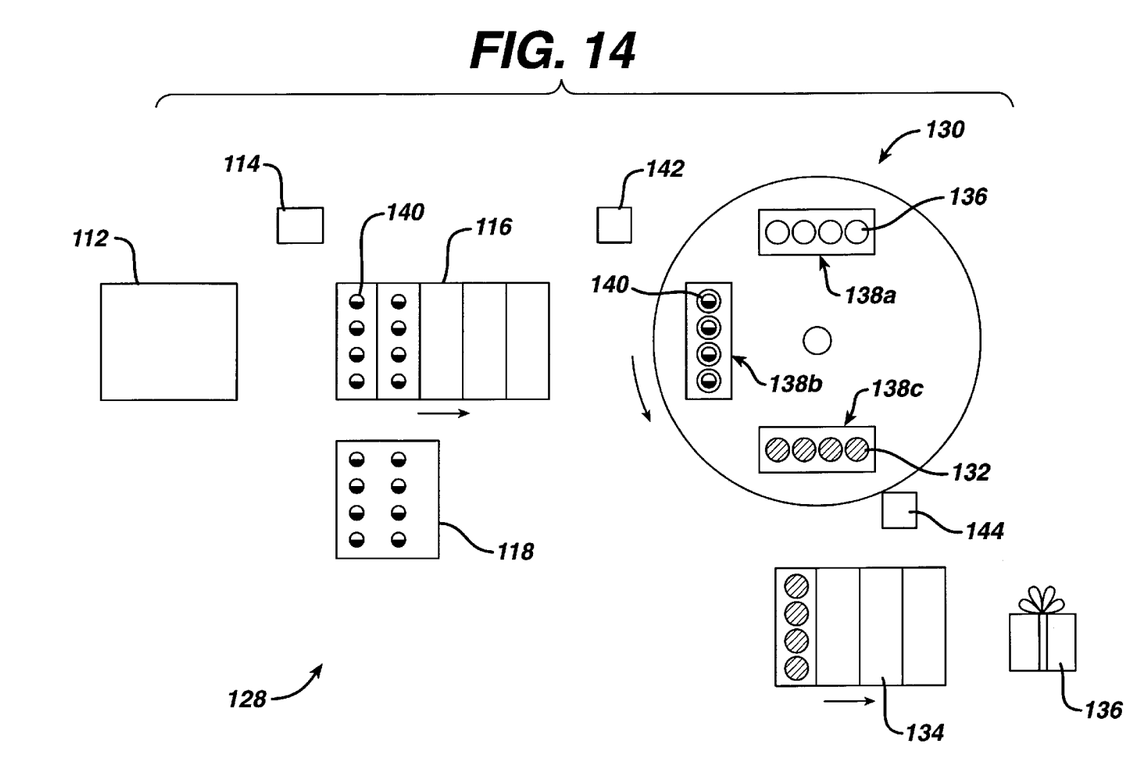
FIG. 14 is a schematic view of another embodiment of the manufacturing apparatus of the present invention.

Referring to FIG. 14, another automated process 128 of the invention is shown in which first automated mechanical transfer 114 removes molded articles 140 from injection molding unit 112, and transports articles 140 to cooling conveyor 116 or cooling station 118. Optionally, automated mechanical transfer 114 selects articles based upon a predetermined criteria (e.g., color) and provides the selected articles (e.g., five articles each having a different color) in the form of an array to packaging machine 130, or to conveyor 116, which moves articles 140 to packaging machine 130, such that articles having predetermined properties can be packaged substantially simultaneously. A second automated mechanical transfer 142 can assist in transferring articles 140 from conveyor 116 to blister pack 136 at first position 138b on packaging machine 130. A third automated mechanical transfer 144 then transfers packaged articles 142 to second conveyor 134 and/or second packaging machine 136 for additional packaging.

Other embodiments are within the claims. For example, the automated processes of the invention can include a hot tufting operation in which tufts of bristles are secured to the body of the toothbrush by hot welding the bristle material to the toothbrush body. Examples of hot tufting operations are disclosed in U.S. Pat. No. 5,143,424 (Boucherie). The bristles can also be secured to the toothbrush body during the molding operation as disclosed, e.g., in U.S. Pat. No. 5,458,400 (Meyer), U.S. Pat. No. 5,609,890 (Boucherie), and U.S. Pat. No. 5,474,366 (Strütt et al.).

In addition, the apparatus can include one or more automated mechanical transfers for moving the toothbrush bodies and toothbrushes throughout the various stages of the processes disclosed.

What is claimed is:

1. An apparatus for manufacturing toothbrushes comprising:
   (a) a molding unit for substantially simultaneously molding toothbrush bodies;
   (b) an element that removes toothbrush bodies from said molding unit;
   (c) a tufter for securing tufts of bristles to toothbrush bodies to form toothbrushes; and
   (d) a transport for automatically moving toothbrush bodies from said removal element to said tufter, wherein said transport comprises an element that selects toothbrush bodies having different properties, and wherein said transport automatically moves the selected toothbrush bodies to said tufter.

2. The apparatus of claim 1, wherein said removal element is capable of removing toothbrush bodies from said mold in the form of an array and maintaining the toothbrush bodies in the array.

3. The apparatus of claim 2, wherein said transport is capable of sequentially providing individual toothbrush bodies from an array of toothbrush bodies to said tufter.

4. The apparatus of claim 1 wherein said transport comprises an element that selects toothbrush bodies having different colors, and wherein said transport automatically moves selected toothbrush bodies to said tufter.

5. The apparatus of claim 1, wherein said molding unit comprises:
   a first cavity defining a toothbrush body;
   a first injection unit in fluid communication with said first cavity; and
   a second injection unit also in fluid communication with said first cavity.

6. The apparatus of claim 5 wherein said molding unit further comprises:
   (a) a second cavity defining a toothbrush body; and
   (b) a third cavity defining a toothbrush body,
   said first injection unit also being in fluid communication with said second cavity, and
   said second injection unit also being in fluid communication with said third cavity,
   said injection units being capable of substantially simultaneously
      (i) injecting a first molding compound having a first property into said second cavity to form a toothbrush body having a first property,
      (ii) injecting a second molding compound having a second property into said third cavity to form a toothbrush body having a second property, and
      (iii) injecting either the first or the second molding compound into said first cavity to form a toothbrush body having a property corresponding to the injected molding compound.

7. The apparatus of claim 5 wherein said molding unit comprises:
   (a) a first cavity defining a toothbrush body; and
   (b) a second cavity defining a toothbrush body,
   said first injection unit being in fluid communication with said first cavity, and
   said second injection unit being in fluid communication with said second cavity,
   said injection units being capable of
      (i) injecting a first molding compound having a first property into said first cavity to form a toothbrush body having a first property, and
      (ii) injecting a second molding compound having a second property into said second cavity to form a toothbrush body having a second property.

8. The apparatus of claim 7, wherein said first cavity and said second cavity define substantially similar toothbrush bodies.

9. The apparatus of claim 1, wherein said injection units are capable of substantially simultaneously
   (i) injecting a first molding compound into said first cavity, and
   (ii) injecting a second molding compound into said second cavity.

10. The apparatus of claim 1, wherein said transport comprises:
    a first conveyor for moving an array of toothbrush bodies to said tufter; and
    a second conveyor for receiving an array of toothbrush bodies from said removal element and moving the array to said first conveyor.

11. The apparatus of claim 1 wherein said element for removing and said transport are provided in the form of an automated mechanical transfer unit.

12. The apparatus of claim 1 wherein said transport is capable of selecting toothbrush bodies to create an array of toothbrush bodies having different properties.

13. The apparatus of claim 12, wherein said properties are colors.

14. The apparatus of claim 1, further comprising:
   a packaging machine that packages individual toothbrushes; and
   a second transport for automatically moving toothbrushes from said tufter to said packaging machine.

15. The apparatus of claim 14 wherein said first transport, said removal element, and said second transport are provided in the form of an automated mechanical transfer unit.

16. The apparatus of claim 14 further comprising a second packaging machine for automatically packaging packaged toothbrushes into a second package such that the second package contains a plurality of toothbrushes having different properties.

17. The apparatus of claim 16, wherein said properties are colors.

18. A process for forming toothbrushes having different properties, said process comprising:
   substantially simultaneously forming toothbrush bodies having different properties in one mold;
   automatically transporting said toothbrush bodies to a tufter; and
   securing tufts of bristles to said toothbrush bodies to form toothbrushes having different properties.

19. The process of claim 18 wherein said properties are colors.

20. The process of claim 18 wherein said step of forming toothbrush bodies comprises forming toothbrush bodies substantially similar in shape.

21. The process of claim 18 further comprising
   automatically transporting said toothbrushes from said tufter to a packaging machine; and
   automatically packaging said toothbrushes.

22. The process of claim 18 further comprising selecting said toothbrush bodies prior to automatically transporting said toothbrush bodies to a tufter.

23. The process of claim 18 further comprising selecting said toothbrush bodies to create an array of differently colored toothbrush bodies prior to automatically transporting said toothbrush bodies to a tufter.

24. An apparatus for manufacturing articles having different properties, the apparatus comprising:
   (a) a molding unit for substantially simultaneously molding articles having different properties;
   (b) an element that removes the articles from mold cavities of said molding unit;
   (c) a packaging machine for automatically packaging the articles; and
   (d) a transport for automatically moving the articles from said removal element to said packaging machine.

25. The apparatus of claim 24 wherein said molding unit comprises
   (i) a mold comprising a plurality of cavities, each cavity defining an article,
   (ii) a first injection unit in fluid communication with a first cavity, and
   (iii) a second injection unit also in fluid communication with said first cavity.

26. The apparatus of claim 24 wherein said transport comprises an element that selects articles having different properties and an element that automatically moves the selected articles to said packaging machine.

27. The apparatus of claim 24 wherein said transport comprises an element that selects articles to create an array of articles having different colors, and an element that automatically moves the selected articles to said packaging machine.

28. The apparatus of claim 24 wherein said second injection unit is also in fluid communication with a second cavity, and said injection units are capable of substantially simultaneously
   (i) injecting a first molding compound having a first property into said first cavity to form an article having a first property, and
   (ii) injecting a second molding compound having a second property into said second cavity to form an article having a second property.

29. The apparatus of claim 24, wherein said transport comprises:
   a first conveyor for moving an array of articles to said packaging machine; and
   a second conveyor for receiving an array of articles from said removal element and moving the array of articles to said first conveyor.

30. The apparatus of claim 24 wherein said element for removing and said transport are provided in the form of an automated mechanical transfer unit.

31. The apparatus of claim 24 wherein said second transport, said removal element, and said first transport are provided in the form of an automated mechanical transfer unit.

32. The apparatus of claim 24 further comprising
   a second packaging machine for automatically packaging packaged articles into a second package such that the second package contains a plurality of differently colored, packaged articles; and
   a second transport for automatically moving packaged articles from said first packaging machine to said second packaging machine.

33. A process for forming articles having different properties from a mold comprising cavities defining substantially similar articles, said process comprising:
   substantially simultaneously forming articles having different properties in the mold;
   automatically transporting said articles to a packaging machine; and
   packaging said articles to form packaged articles having different properties.

34. The process of claim 33 wherein said properties are colors.

35. The process of claim 33 further comprising selecting said articles prior to automatically transporting said articles to the packaging machine.

36. The process of claim 33 further comprising selecting said articles to create an array of differently colored articles prior to automatically transporting said articles to the packaging machine.

37. An apparatus for manufacturing an article, said apparatus comprising:
   (a) a molding unit for molding an article, said molding unit comprising
      (i) a first cavity defining an article,
      (ii) a first injection unit in fluid communication with said first cavity, and
      (iii) a second injection unit also in fluid communication with said first cavity;
   (b) an element that removes the article from said molding unit;
   (c) a packaging machine for automatically packaging the article; and
   (d) a transport for automatically moving the article from said removal element to said packaging machine.

* * * * *